Figure 2:
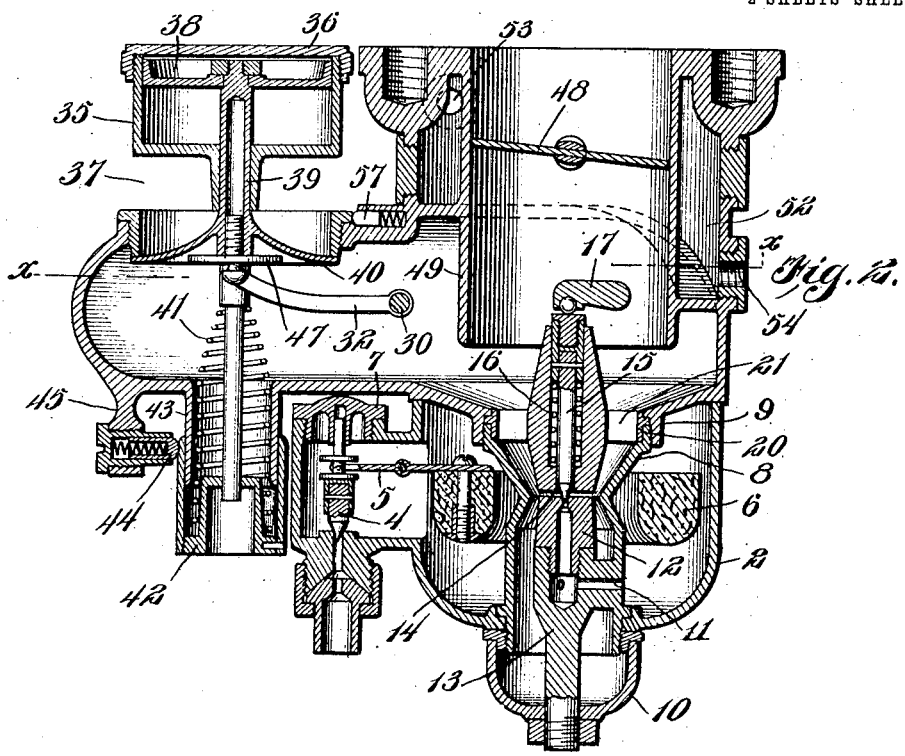

A. H. WEBBER.
CARBURETER.
APPLICATION FILED MAR. 18, 1913.
1,120,573.
Patented Dec. 8, 1914.
2 SHEETS—SHEET 1.
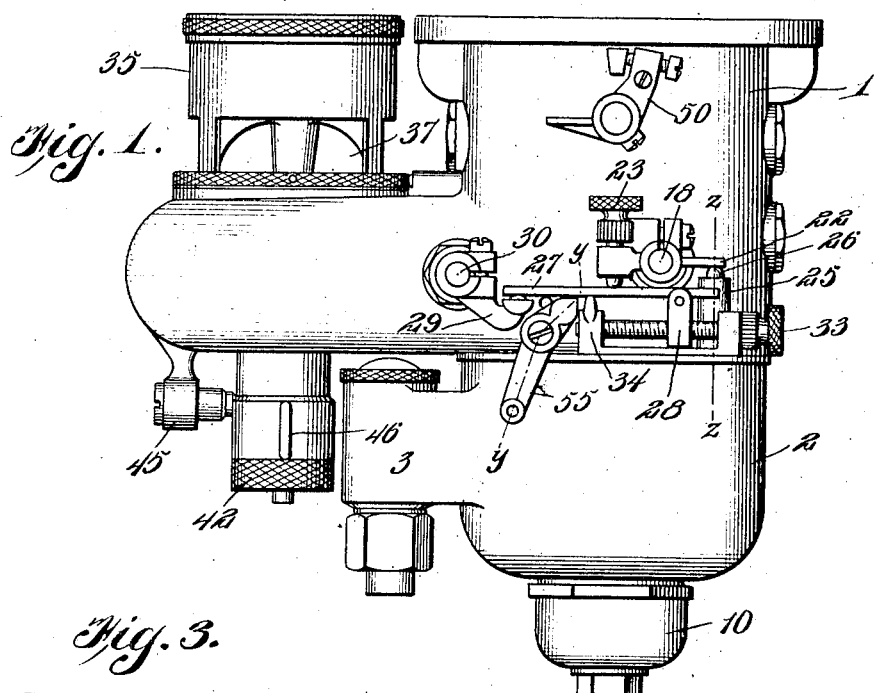
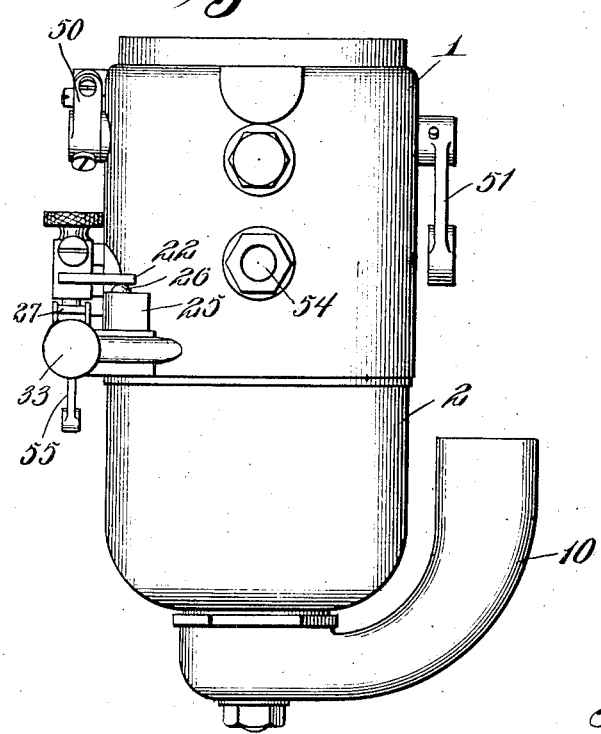
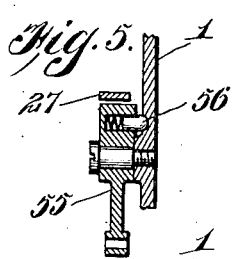
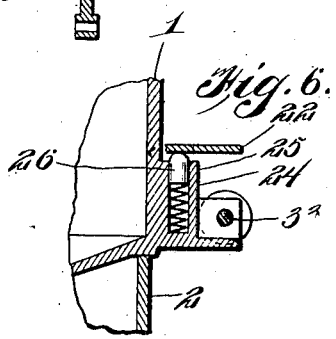
Witnesses
Louis R. Heinrichs
U. B. Hillyard
Inventor
Arthur H. Webber
By Victor J. Evans
Attorney

UNITED STATES PATENT OFFICE.

ARTHUR H. WEBBER, OF BOSTON, MASSACHUSETTS, ASSIGNOR TO WEBBER MFG. CO., A CORPORATION OF MASSACHUSETTS.

CARBURETER.

1,120,573.  Specification of Letters Patent.  Patented Dec. 8, 1914.

Application filed March 18, 1913. Serial No. 755,209.

*To all whom it may concern:*

Be it known that I, ARTHUR H. WEBBER, a citizen of the United States, residing at Boston, in the county of Suffolk and State of Massachusetts, have invented new and useful Improvements in Carbureters, of which the following is a specification.

The invention has relation to means for vaporizing liquid fuel to produce a gaseous mixture for use in the operation of internal combustion engines, the purpose being to provide novel means for regulating the supply of air and fuel under varying conditions of speed to the end that a proper mixture may be obtained.

The invention provides a carbureter having the fuel spray nozzle and valve located in a constricted part of the air inlet, thereby insuring the breaking up of every particle of fuel and the thorough vaporization thereof which is essential to economy in the use of fuel and to the production of a homogeneous mixture to prevent fouling of the engine and a slow combustion of the mixture when ignited.

A further purpose of the invention is the provision of a carbureter in which the fuel valve is automatically controlled by means of the valve closing the auxiliary air inlet, the connections between the parts being such that the supply of fuel is proportionate to the amount of air admitted through the auxiliary air inlet.

A further purpose of the invention is the provision of means for adjusting the connections between the fuel valve and auxiliary air valve whereby the proportionate amount of fuel may be regulated while the engine is in operation or at any time as may be required, said adjustment being effected without changing the adjustment of the fuel valve when set for low speed.

The invention also provides means whereby the auxiliary air valve may be adjusted without in any manner affecting the adjustment of the fuel valve for low or high speed, thereby giving such auxiliary air valve a lead, whereby it may have a limited movement without producing any movement of the fuel valve.

The invention further provides means for securing the auxiliary air valve and releasing the fuel valve, whereby a rich mixture may be supplied to the engine for starting in cold weather, both operations being effected simultaneously and by movement of a single element.

A further purpose of the invention is to provide means whereby a thorough commingling of the air and vapor is accomplished to produce a homogeneous mixture which in the operation of the engine would produce the best possible results.

The invention consists of the novel features, details of construction and combination of parts, which hereinafter will be more particularly set forth, illustrated in the accompanying drawings, and pointed out in the appended claims.

Figure 4:
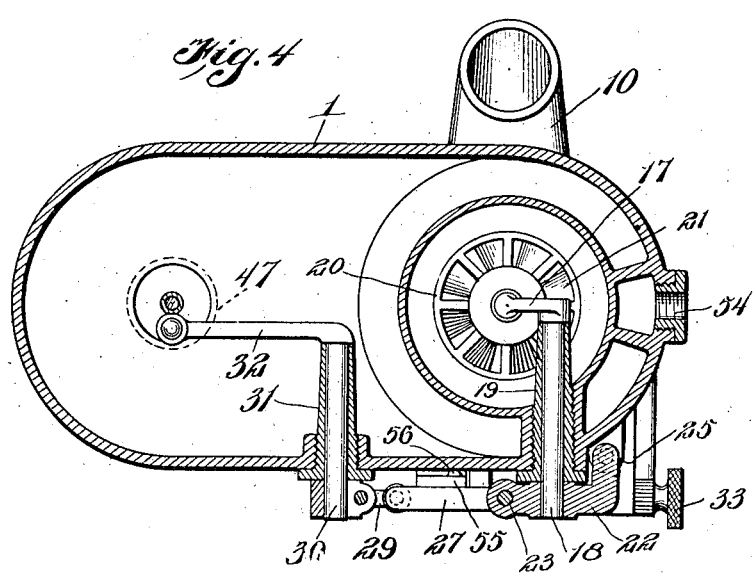

Referring to the drawings, forming a part of the specification, Figure 1 is a side view of a carbureter embodying the invention. Fig. 2 is a vertical central longitudinal section. Fig. 3 is an end view. Fig. 4 is a horizontal section on the line $x$—$x$ of Fig. 2. Fig. 5 is a detail view on the line $y$—$y$ of Fig. 1, showing the lever for releasing the fuel valve and securing or holding the auxiliary air valve to its seat when it is required to start the engine in cold weather to insure a supply of rich mixture. Fig. 6 is a detail view on the line $z$—$z$ of Fig. 1, showing the means for holding the fuel valve in a given position.

Corresponding and like parts are referred to in the following description, and indicated in all the views of the drawings, by the same reference characters.

The numeral 1 designates the body of the carbureter which is hollow and oblong in form. A cup 2 is pendent from the bottom of the carbureter body and receives fuel from a tank or other source of supply. A hollow extension 3 is located at one side of the cup and receives a valve 4, which controls the feed of the fuel, being connected with one end of a lever 5 to the opposite end of which is attached a float 6 which is arranged to operate in the cup 2. The feed pipe, not shown, is adapted to be coupled to the lower end of the extension 3. The valve 4 has its stem arranged to operate in an opening formed in a cap 7 which closes the upper end of the extension 3.

A Venturi tube 8 extends vertically through the cup 2 and is threaded at its upper end to a collar 9 pendent from the bottom of the carbureter body 1. The lower end of the Venturi tube 8 makes close connection with the bottom of the cup 2 and has a tubular fitting 10 coupled thereto, said tubular fitting forming the primary air inlet and curving upwardly along one side of the cup 2. Passages 11 are formed in a side of the Venturi tube for the passage of the liquid fuel from the cup. A spray nozzle 12 is located within the Venturi tube and is connected at its lower end with an extension 13 thereof, said extension being hollow at its upper end and comprising a stem which extends through the lower portion of the tubular fitting 10 and receives a nut for holding said tubular fitting or primary air inlet in place. The passages 11 communicate with the chamber formed in the principal part of the extension 13. The spray nozzle 12 is threaded to the extension 13 and is formed with a vertical opening and lateral outlets 14 said outlets being minute and radiating in all directions to deliver the fuel in substantially the form of a spray. The outlets 14 are located about in the plane of the constricted part of the Venturi tube. The fuel valve 15 is mounted in an extension of the spray nozzle and is pressed upwardly by means of an expansible helical spring 16, which is confined between an inner shoulder of the spray nozzle and an outer shoulder of the fuel valve. An arm 17 is arranged to overhang the fuel valve and is normally acted upon by spring pressure to hold the fuel valve seated against the tension of the spring 16. The arm 17 is carried by a shaft 18 which is mounted in a bearing 19 fitted in a side of the carbureter body, said bearing being in the form of a sleeve which is threaded into a lateral opening of the carbureter body. A ring 20 surrounds the upper portion of the spray nozzle and is located at the upper end of the Venturi tube and is formed with an outer flange which is confined between the upper end of the Venturi tube and an inner flange of the collar 9. A plurality of openings 21 are formed in the ring 20, such openings being inclined to the vertical so as to impart a whirling motion to the gaseous mixture, with the result that all particles of the fuel are broken up and caused to commingle with the air so as to produce a homogeneous mixture. The ring 20 may be formed with the extension of the spray nozzle and serve as means for holding such extension in place.

A lever 22 is clamped or otherwise secured to the outer end of the shaft 18 and is preferably of L form and is provided at one end with a set screw 23 and its opposite end is arranged to be pressed upwardly by means of a spring which is of greater tension than the spring 16 so as normally to hold the fuel valve 15 seated against the action of such spring 16. The spring 24 is of helical form and expansible and is located within a casing 25, which also receives a plunger 26, which may be of any form, said plunger being held in contact with the offstanding end of the elbow lever 22.

A lever 27 is mounted near one end upon a fulcrum 28 and its opposite end engages an arm 29 clamped or otherwise secured to the outer end of a shaft 30, which is mounted in a bearing sleeve 31 threaded into a side of the carbureter body 1. The inner end of the shaft 31 has an arm 32 which is arranged to coöperate with the auxiliary air inlet controlling valve. The lever 27 has a recess intermediate of its ends to receive the extremity of the set screw 23, thereby holding such parts in fixed relation. A threaded rod 33 is mounted in bearings and has screw-thread connection with the fulcrum 28 to move the latter as may be required to obtain the proper adjustment between the auxiliary air inlet and fuel valve. The inner bearing, as 34, of the threaded rod 33 forms a rest for the lever 27 to normally hold it in given position.

A chamber or valve cage 35 is fitted to an end portion of the carbureter body 1 and is threaded thereto so as to be adjusted. A cap 36 is threaded to the upper end of the chamber 35 and closes the same. Openings 37 are formed in the sides of the chamber or valve casing 35 for the admission of air. The upper portion of the chamber or valve casing constitutes a cylinder in which a piston 38 is arranged, the same being attached to a stem 39 having a valve 40 at its lower end arranged to close the lower end of the chamber and thereby cut off the auxiliary air supply. The lower end of the chamber 35 forms a seat for the valve 40, the latter being normally held closed by means of a helical spring 41 which is supported at its lower end by means of a cap 42 which is threaded to a tubular extension 43 pendent from the lower side of the carbureter body in line with the valve stem 39. The tension of the spring 41 may be regulated by advancing or backing the cap 42, the latter being held in the required adjusted position by means of a spring actuated stop 44 fitted to an extension 45 pendent from the carbureter body. The cap 42 has a number of longitudinal grooves 46 upon its outer side to be engaged by means of the stop 44, thereby preventing casual movement of the cap after being adjusted. A flange 47 is formed with or otherwise provided upon the stem 39 and is adapted to be engaged by the arm 32. The flange 47 constitutes an annular stop. When the piston 38 moves downward in the cylinder 35 the valve 40 is unseated, thereby admitting air through the auxiliary air inlet and at the same time the stop 47 presses downward upon the arm 32 and turns the shaft 30 in its bearing, with the result that the outer end of the arm 29 is moved upward, thereby elevating the end of the lever 27 in contact wherewith and moving the set screw 23 upward and causing the shaft 18 to turn and move the arm 17 away from the fuel valve, which is pressed upward by the spring 16 to admit a greater supply of fuel proportionate to the additional amount of air entering through the auxiliary inlet. The ends of the arms 29 and 32 are provided with balls to reduce the friction to the smallest amount possible. When the valve 40 is unseated to admit a greater supply of air, as when the engine is speeding, the lever 27 is operated and releases the fuel valve from the action of the spring 24, thereby admitting the spring 16 to come into play to move the fuel valve so as to uncover the outlets 14 to a greater extent, whereby a larger supply of fuel is delivered through the spray nozzle, the additional supply of fuel being proportionate to the unseating of the valve 40 and the additional supply of air admitted through the auxiliary air inlet. By moving the fulcrum 28 the degree of movement of the fuel valve 15 may be regulated to vary the additional supply of fuel proportionate to the additional air supplied through the auxiliary air inlet. By varying the position of the chamber or valve casing 35 which may be effected by screwing or unscrewing the same with reference to the carbureter body 1 the valve 40 controlling the auxiliary air inlet may be positioned so as to have a lead or limited movement without producing any movement of the lever 27 or fuel valve 15. This is of advantage under certain conditions to prevent the production of a too rich mixture. It is noted in this connection that the lever 27 is supported upon the fulcrum 28 and bearing 34 and that the fuel valve 15 is adapted to be adjusted for low speed by means of the set screw 23 without being affected by any adjustment of the fulcrum 28 when it is required to move the same to regulate the proportionate amount of fuel to be admitted when the auxiliary air inlet is open.

A throttle valve 48 of the butterfly type is provided for controlling the supply of gaseous mixture to the engine. This valve is located in a tubular outlet 49 forming a part of the carbureter body and located above and in line with the Venturi tube 8. The journals of the throttle valve project beyond opposite sides of the carbureter body, one of such journals receiving an adjustable stop 50 and the other journal receiving an arm 51 to which the throttle control, not shown, is adapted to be connected. A jacket 52 surrounds the tubular outlet 49 and is provided with an inlet 53 and an outlet 54. Hot water or other heating medium is adapted to be circulated through the jacket and surround the tubular outlet for warming the gaseous mixture to prevent condensation of the gasified fuel.

In cold weather when starting an engine of the internal combustion variety it is desirable to supply a rich mixture. This is usually accomplished by priming, which consists of supplying an excess of fuel so that ignition of the mixture will be rendered positive and certain, thereby greatly facilitating the starting of the engine. In the present instance a priming lever 55 is located at one side of the carbureter body so as to be brought in contact with the arm 29 and the adjacent end of the lever 27, whereby said arm 29 is made secure to prevent unseating of the auxiliary air inlet controlling valve 40 and the lever 27 is moved to relieve the fuel valve 15 of the action of the spring 24 so that such fuel valve may be unseated and thereby insure ample supply of fuel to produce a rich mixture which is drawn into the engine to insure ready starting thereof, after which the priming lever 55 is moved to release the arm 29 and the lever 27, thereby admitting of the carbureter operating in the ordinary manner when the engine is running. As indicated most clearly in Fig. 1 of the drawings the upper end of the lever 55 is recessed in the side facing the arm 29 to receive the extremity thereof and hold such arm against movement when priming the engine. The priming lever 55 is provided with a spring actuated stop 56 which is adapted to enter depressions formed in the adjacent side of the carbureter body so as to hold the priming lever in either one of its two positions.

It is noted that by having the piston 38 arranged to operate in the cylinder or upper portion of the chamber or valve casing 35 which is closed by the cap 36 the auxiliary air inlet control valve 40 is prevented from jumping or moving rapidly when the throttle is suddenly thrown wide open. The piston 38 and coöperating cylinder form in effect a dash pot for controlling the movements of the valve 40. The constricted part of the air passage through the Venturi tube 8 is in the plane of the outlets 14, hence the air passing through the Venturi tube is accelerated at the constricted part, thereby insuring a positive supply of fuel which is discharged into such air passage in an annular spray to be taken up by the ascending current of air. The position of the fuel valve 15 for low speed is regulated by means of the set screw 23. The carbureter is adjusted for high speed by moving the fulcrum 28. When the speed of the engine increases to such an extent that the air entering the primary inlet 10 is insufficient the valve 40 is unseated, thereby admitting the proper amount of air through the auxiliary air inlet and at the same time the fuel valve 15 is moved farther away from its seat to admit an additional amount of fuel proportionate to the increase in the amount of air admitted through the auxiliary air inlet. This is effected by operation of the lever 27, which moves the lever 22, thereby compressing the spring 24 and carrying the arm 17 upward so that the spring 16 may unseat the valve 15 and admit the increased supply of fuel. The degree of movement of the lever 27 is determined by the relative position of the fulcrum 28, which varies the effective leverage. Should it be required to give the valve 40 a limited movement without producing a corresponding movement of the arm 32 and lever 27 the chamber or valve casing 35 may be adjusted in the manner stated, a spring actuated catch 57 serving to hold the same in the required adjusted position.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

It is noted that the air entering the auxiliary air inlet passes entirely around the lower end of the outlet tube 49 and enters the same from all sides and becomes thoroughly mixed with the whirling column of gas issuing from the Venturi tube.

Having thus described the invention what is claimed as new, is:—

1. In a carbureter the combination of a fuel valve, a valve casing having an auxiliary air inlet, an air valve for closing the valve casing and movable therewith, and connecting means between the air and fuel valves, said valve casing having adjustable connection with the carbureter body to vary the distance between the air valve and connecting means whereby provision is had for giving such air valve a lead over the fuel valve.

2. In a carbureter having primary and auxiliary air intakes, a valve for closing the auxiliary air intake, a fuel valve arranged in the primary air intake, connecting means between the fuel valve and the valve for controlling the auxiliary air intake, and a priming lever arranged when operated to hold the valve closing the auxiliary air intake seated and to effect an opening of the fuel valve to insure a rich mixture being supplied to the engine when starting.

3. A carbureter having primary and auxiliary air intakes, a valve for closing the auxiliary air intake, a fuel valve, connecting means coöperating with the valve for closing the auxiliary air intake, such means including an arm, other connecting means coöperating with the fuel valve, such connecting means including a set screw, a lever arranged to engage the set screw and arm, and a priming lever arranged to engage the said arm to hold the auxiliary air controlling valve seated and to engage the said lever to effect an opening of the fuel valve to insure a rich mixture being supplied to the engine.

4. In a carbureter having an air passage, a nozzle arranged for delivering fuel into said air passage, a fuel valve for closing the fuel outlet, a spring normally tending to unseat the valve, a second spring of greater tension than the first mentioned spring to overcome the force thereof and hold the fuel valve seated, and means for overcoming wholly or in part the tension of the said second spring to admit of the first spring opening the fuel valve.

In testimony whereof I affix my signature in presence of two witnesses.

ARTHUR H. WEBBER. [L. S.]

Witnesses:
  CARL KROTVI,
  JOSEPH V. CHATIJUY.